Figure 1:
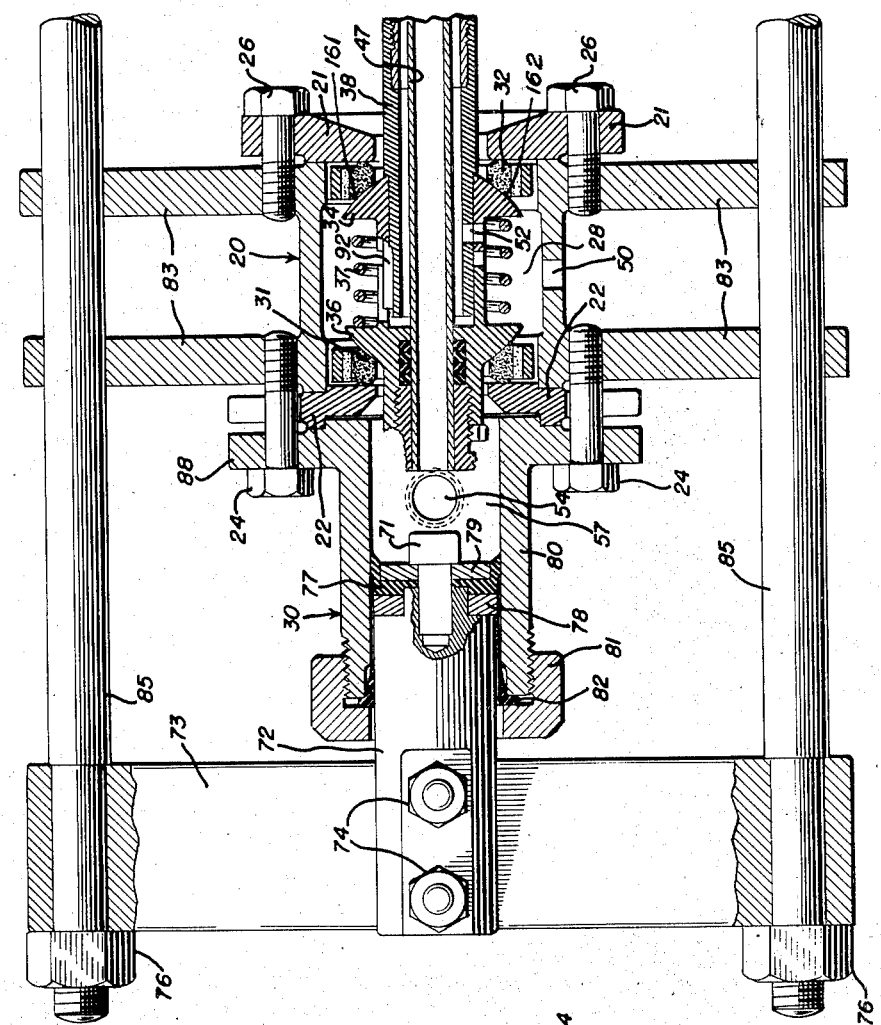
Figure 2:
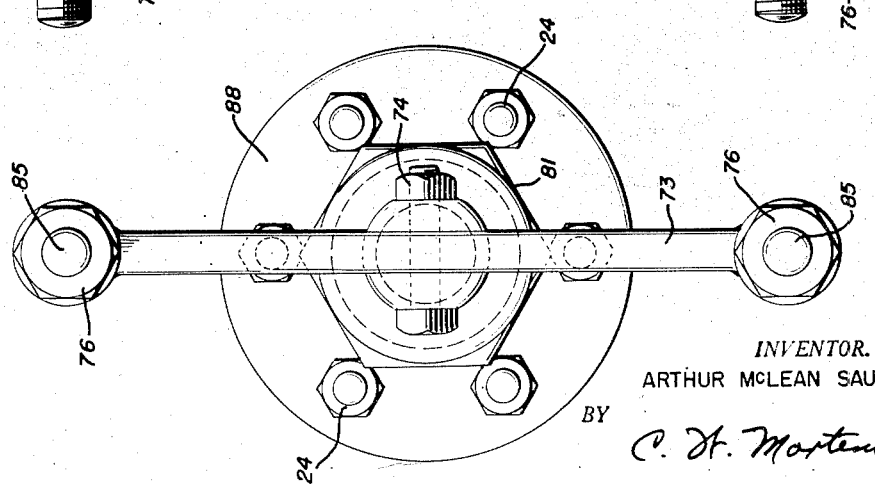

April 5, 1955 — A. McL. SAUM — 2,705,650
BALANCED ROTARY FLUID SEAL
Filed July 15, 1950 — 2 Sheets-Sheet 1

INVENTOR.
ARTHUR McLEAN SAUM
BY
*C. H. Mortenson*
ATTORNEY

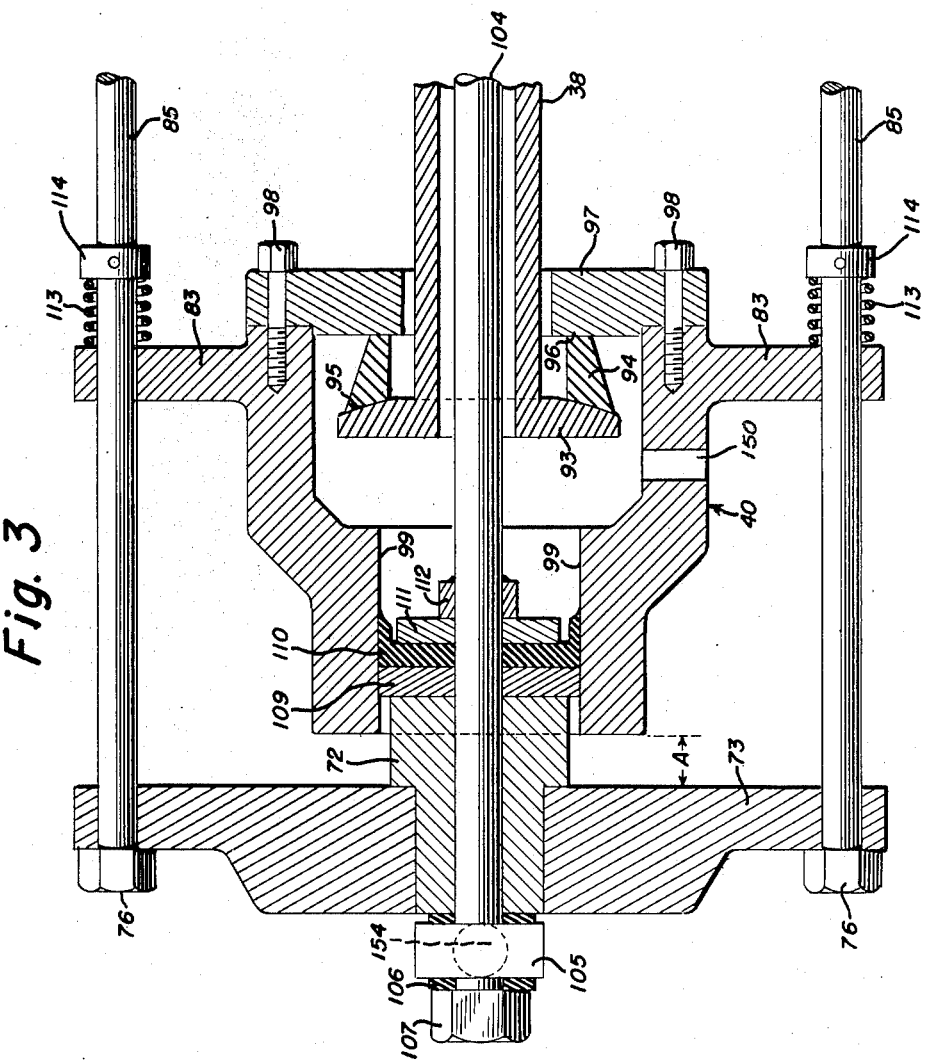

United States Patent Office

2,705,650
Patented Apr. 5, 1955

2,705,650
BALANCED ROTARY FLUID SEAL

Arthur McLean Saum, Waynesboro, Va., assignor to E. I. du Pont de Nemours and Company, Wilmington, Del., a corporation of Delaware Application July 15, 1950, Serial No. 173,971

3 Claims. (Cl. 285—9)

This invention relates to self-aligning rotary fluid seals, and in particular, to an improvement in such seals to allow their use under drastic operating conditions.

Rotary fluid seals, presently in use on steamheated rolls in particular, are described in U. S. Patents 1,929,635, 2,222,612 and 2,385,421. In the rotary seals of these patents, effective sealing, in spite of misalignments due to error in manufacture, installation and those produced by operation, is obtained through the cooperation of a spherical flange with a recessed sealing ring, which is preferably of a self-lubricating material such as graphite, bronze, or some other suitable material. Naturally, the sealing ring, usually graphite, undergoes the greatest wear in this arrangement and a periodic replacement is required. Under constant operation at normal pressures of steam up to 100–150 p. s. i., the wear on a sealing ring is not excessive. However, when operating under higher steam pressure, for example, in the neighborhood of 250 p. s. i. and above, particularly at high speeds of revolution such as 900 R. P. M., the wear on the sealing rings becomes excessive, and frequent shut-downs of the equipment are necessary to replace the sealing ring. As pointed out in the above-mentioned patents, the creation of additional pressure within the body of the joint will have the effect of urging the sealing members into tighter sealing relations. This additional thrust on the seal faces causes excess wear and a power loss in the formation of heat by the rotary seal.

Accordingly, it is an object of this invention to provide an improved self-aligning rotary seal. It is a particular object to provide a sealing structure embodying a single sealing ring in a construction such that the sealing ring will have long life under drastic operating conditions. Another object is to provide such means which can be readily added to, or initially embodied in, previously known machines so as to impart thereto the mentioned and other structural and functional features of advantage. Other objects will become apparent from the description of the invention which follows.

The objects of this invention are accomplished by the provision of a self-aligning rotary fluid seal in which the pressure across the sealing area remains at the substantially constant low level required for effective sealing. Any additional pressure across the sealing face is balanced, for example, by means of a counter-balancing thrust device such as a piston operating in a cylinder or a pressure-sensitive bellows or diaphragm, the effective area of which is equal to, or slightly less than, the effective area of the fluid seal. Better understanding of this invention may be obtained by reference to the drawings, wherein modifications of the invention are disclosed.

Figure I is a cross-sectional view through a rotary steam joint modified in accordance with the present invention;

Figure II is an end view of the device shown in Figure I and

Figure III is a cross-sectional view of a simplified version of the present invention.

In Figure I there is shown a rotary pressure joint which has been modified with a piston and a cylinder arranged to extend backwards from the joint case. The joint case is comprised of a front housing 30 and a rear pressure housing 20. Housings 20 and 30 are held non-rotatable by means of guide rods 85 which are supported by a frame (not shown) and which pass through the extending arms 83 of the housing 20. Housings 20 and 30 are bolted together by means of bolts 24 which also hold in place the adapter 22.

The housing 30 comprises a cylinder 80 having a flanged end 88 to receive bolts 24 and threaded at the other end to receive cap 81 and piston or rod 72. Against the inner face of the adapter 22 is a sealing ring 31 contained in the housing 20 and acting to prevent leakage of fluid entering the chamber 28 of housing 20 directly into the chamber 57 of housing 30. This fluid or vapor such as steam enters through inlet 50 and then through opening 52 and from there to the annular passage between the nipple 38 and condensate pipe 47. The steam or fluid under pressure flows through the rotating roll or drum (not shown) and returns through pipe 47 to chamber 57 and then out exit 54 for recovery or recycling.

In the housing 20, the nipple 38, the condensate pipe 47 and convex shoulder 34 are mounted so that they rotate with the drum being heated. The convex shoulder 36 also rotates with condensate pipe 47 by virtue of key 92 but has freedom of movement lengthwise of pipe 47. A sealing ring 32 seals against the convex shoulder 34 on nipple 38 and against the wear plate 21. The wear plate 21 is held stationary by bolts 26 anchoring to arms 83. The sealing ring 31 seals against adapter 22 and against convex shoulder 36. In the absence of other forces, spring 37 keeps the convex shoulders 34 and 36 in sealing relation with the sealing rings 31 and 32, respectively. The shoulders 34 and 36 are held to rotate together by key 92. The pressure of fluid or vapor such as steam in chamber 28 augments the sealing force on convex shoulders 34 and 36 in direct proportion of the pressure of said fluid or vapor.

Since these shoulders are rotating with the nipple and the condensation pipe and are under the influence of pressure from the steam, wear on the rings is excessive at the high speed and pressures being used. As mentioned above piston 72 is mounted so that it extends into chamber 57 of housing 30. This piston is bolted to cross bar 73 by nut and bolts at 74 and the extent to which it extends into chamber 57 is adjusted by nuts 76 on bars 85 on which the cross bar is supported. The piston assembly forms a close fit with the cylinder walls 80 by means of a resilient packing cup 77 held in place by a back-up ring 78, a washer 79 and stud 71. A secondary seal between piston 72 and cylinder 80 is afforded by the threaded cap 81 and gasket 82.

The steam or fluid under pressure flows into chamber 57 and pressure is exerted against the piston and cylinder. The piston is stationary but the housing 30 is slideably mounted on it. The thrust exerted on the face of the piston assembly forces the whole case to the right. This motion moves wear plate 21 to the right and the pressure on ring 32 is decreased. In other words, the pressure is dissipated in part by the movement of the case to the right and the pressure exerted on the rings by the shoulders is decreased. Without the sliding motion that results the pressure is exerted on the sealing rings, shortening the life of the rings and the power loss in the formation of heat by the rotating seal.

Reference has been made to the effective area of the seal. This area is the area of the outside circle described by the contact of the convex shoulder with the sealing ring, as, for example, element 34 with 32, the diameter of the circle in this instance being the distance between reference points 161 and 162. If the area of the cylinder 80 is made slightly less than the effective area of the carbon seal, a condition of balance results because of the tendency of the housing and cylinder to move laterally to the right and take some of the thrust off the rotating seal. If the area of the cylinder 80 is greater than the effective area of the seal, the housing will move too far and the joint will not be effective. If the areas are equal, perfect balance should result, but then no thrust would be required to unseat the seal, and it would thus be unstable.

By using a stationary condensate pipe in the vapor-heated roll or drum it is possible to employ a rotary pressure joint having but one sealing ring. The design of a rotary pressure joint embodying this simplification and in accordance with the principles of this invention is shown in Figure III. In this modification the nipple 38 of the rotary joint is rotated in operation. The housing 40 is held against rotation by means of the guide rods 85 which pass through the extending arms 83 of the housing 40. The guide rods 85 extend from the frame (not shown) and are stationary. The nipple 38 extends into the rotating drum (situated at the right but not shown) and will be rotated at the same rate. The nipple 38 has a spherical flange 93 seating in a similarly-shaped recess 95 of the sealing ring 94, which is preferably of a self-lubricating material, such as graphite, bronze, or some other suitable material. The face portion 96 of the sealing ring 94 seats against the head 97 having an opening therein considerably larger than the diameter of the nipple 38. The head 97 is fixed to the housing 40 by means of the studs 98. The ball and socket action of the spherical flange 93 and the sealing ring 94 provides an effective seal in all angular positions possible for the nipple 38 to assume within the opening in the head 97. For maximum flexibility of the ball and socket action, the shape of the contact should be such that it is a portion of a sphere whose center lies in the center of the cylinder formed by walls 99.

As shown in this design the housing 40 and the cylinder portion 99 can be one piece. Such an arrangement takes up less space on the machine and is cheaper to fabricate. The stationary piston is similar to that shown in Figure I. It is held by the cross head 73 which is fixed to the guide rods 85 by means of the nuts 76. The piston comprises the thrust bar 72, the back-up ring 109, packing cup 110 and washer 111 and is prevented from moving laterally to the right by means of the welded ring 112 fixed on the stationary condensate pipe 104. The back-up ring 109 and the resilient packing cup 110 form a close sliding fit with the cylinder portion 99 of the housing 40.

The condensate pipe 104 is concentric with nipple 38 and smaller in diameter. It is centered within the rotating roll or drum at one end and is positioned at the other end by the cross head 73 by means of the collar 105, gasket 106 and the nut 107. The condensate, derived from the fluid entering inlet 150, is removed continuously through suitable perforations 154 in the collar 105.

In actual operation the heating vapor, such as steam, enters the housing 40 of the rotary joint through a hole (not shown) and flows into the rotating roll or drum through the annular passageway between the condensate pipe 104 and the nipple 38. The housing 40 of the rotary steam joint, including the head 97, floats on the guide rods 85 and is capable of lateral movement. In this design wherein the condensate pipe extends through the cylinder and piston, the effective area of the piston, again, must be slightly less than the effective area of the rotating seal. If the area of the cylinder is made equal to the effective area of the rotating seal, a condition of perfect balance should result. Actually such a condition is unobtainable because the seal would be unstable, and no thrust would be required to unseat the seal. In addition, it is necessary to add some spring tension to obtain an initial seating of the seal before the steam pressure builds up. In Figure III this tension is applied by means of the springs 113 and locking collars 114 on the guide rods 85. The spring tension also compensates for the differential thermal expansion of the joint elements and overcomes the friction of the housing on the guide rods.

The simplified design shown in Figure III has additional features. The wear on the sealing ring 94 may be determined by the position of the housing 40 with respect to the cross head 73. When the sealing ring 94 wears to the point where the dimension A is zero, steam will begin to leak. Thus, a simple positive method of indicating when the sealing ring should be replaced is obtained. With this arrangement a continual check may be made and the expected remaining life of the sealing ring estimated. Replacements can then be made at the convenience of production. In addition, if a sealing ring should wear out or break, damage to the spherical flange 93 and seal plate 97 would be prevented since they cannot contact each other.

The rotation of the housing 40 is prevented by arms 83 through which guide rods 85 pass. A single set of arms is all that is needed since the piston also guides the housing. This reduces the friction loss over that encountered with the double arms on the joint shown in Figure I. Further, only two (94 and 110) instead of three (31, 32 and 77) seals are needed. Only one instead of two sealing rings are required.

Graphite sealing rings are generally employed in the commercially available rotary pressure joints. It has been found that these carbon rings will not stand gauge pressures in excess of 200 p. s. i. while running at 800 R. P. M. for satisfactory periods of time. At such speeds, and gauge pressures of 260 p. s. i., the life of a sealing ring ranged from one to three weeks, and the power consumption at pressures over 300 p. s. i. often exceeded 5 to 6 horsepower per joint. At higher speeds of operation, such as 900 R. P. M. and more, the service life of a carbon ring is reduced to about three days. Wear test data on the carbon rings, using a rotary pressure joint balanced according to this invention, have been collected. These tests were run at 250 p. s. i. g. steam pressure and at 980 R. P. M. using graphite sealing rings. From these data, it has been determined that the useful life of a graphite sealing ring in a balanced rotary pressure joint is from 12 to 18 months. In addition, the power consumption is no more than 10 per cent of that of an unbalanced rotary pressure joint. For best results, the carbon sealing ring should be tapered as shown in Figure III. With this arrangement, it has been found that the sealing ring rotates at roughly half the speed of the nipple 38 and the wear on the ring takes place uniformly at both contact surfaces. In this manner, maximum friction is prevented at either surface and longer service life results.

Accordingly, this invention has provided a self-aligning rotary-fluid seal of the type described in which the pressure across the sealing area remains at the substantially constant low level required for effective sealing. Commercially available rotary pressure joints can be modified to give long satisfactory service at high operating temperature, pressure, and at high speeds of revolution. The service life of carbon-sealing rings under rigorous operating conditions has been increased one hundred times and more.

Any departure from the above description which conforms to the present invention is intended to be included within the scope of the claims.

I claim:

1. In a rotary seal, a housing containing an inlet for fluid under pressure; connected to said housing a second housing containing an exit for said fluid under a pressure reduced from said initial pressure; in said first housing a conduit for leading said fluid to a chamber and a slidable conduit within said first-named conduit for leading from said chamber fluid under reduced pressure through said first housing to said second housing sealed therefrom and in first-named housing a member secured to said first-named conduit rotatable therewith in axial sealing contact with a sealing ring seated in said first housing to prevent leakage of said fluid past said first-named conduit; and in said second housing a bore aligned with the axis of said sealing ring and receiving a stationary piston upon which said second housing is slidably mounted, said piston being arranged to reduce the force of said sealing contact by having an area slightly less than the outside circle described by the contact of said rotatable member with said sealing ring; and a sealing means about said piston.

2. Apparatus in accordance with claim 1 in which said slidable conduit directs said fluid under reduced pressure against said piston and toward said exit in said second housing.

3. In a rotary seal, a housing containing an inlet for fluid under pressure, a conduit for leading said fluid to a chamber and a stationary conduit within the first-named conduit for leading from said chamber fluid under reduced pressure through said housing to a stationary exit; in said housing a member about said first-named conduit rotatable therewith in axial sealing contact with a sealing ring in said housing to prevent leakage of said fluid past said first-named conduit; in said housing a bore aligned with the axis of said sealing ring and receiving a stationary piston upon which said housing is slidably mounted, said piston being arranged to reduce the force of said sealing contact by having an area slightly less than the outside circle described by the contact of said rotatable member with said sealing ring; and a sealing means about said piston.

References Cited in the file of this patent

UNITED STATES PATENTS

| | | |
|---|---|---|
| 921,771 | Whitlock | May 18, 1909 |
| 1,130,358 | Whitney | May 2, 1915 |
| 1,769,905 | Berry | July 1, 1930 |
| 1,825,251 | Schellens | Sept. 29, 1931 |
| 1,929,635 | Goff | Oct. 10, 1933 |
| 2,010,930 | Rowe | Aug. 13, 1935 |
| 2,385,421 | Monroe | Sept. 25, 1945 |
| 2,402,224 | Hornbostel | June 18, 1946 |